United States Patent
Chen et al.

(10) Patent No.: US 12,088,409 B2
(45) Date of Patent: Sep. 10, 2024

(54) RANDOM ACCESS METHOD, TERMINAL DEVICE AND NETWORK DEVICE

(71) Applicant: VIVO MOBILE COMMUNICATION CO.,LTD., Guangdong (CN)

(72) Inventors: Xiaohang Chen, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 710 days.

(21) Appl. No.: 17/144,010

(22) Filed: Jan. 7, 2021

(65) Prior Publication Data

US 2021/0126733 A1     Apr. 29, 2021

Related U.S. Application Data

(63) Continuation of application No. PCT/CN2019/096505, filed on Jul. 18, 2019.

(30) Foreign Application Priority Data

Jul. 31, 2018    (CN) .......................... 201810858499.8

(51) Int. Cl.
  *H04L 1/00*     (2006.01)
  *H04L 5/00*     (2006.01)
  *H04W 72/21*    (2023.01)
  *H04W 74/08*    (2024.01)
  *H04W 74/0833*  (2024.01)

(52) U.S. Cl.
  CPC .......... *H04L 1/0003* (2013.01); *H04L 1/0009* (2013.01); *H04L 5/0048* (2013.01); *H04W 72/21* (2023.01); *H04W 74/0833* (2013.01)

(58) Field of Classification Search
  CPC ............. H04W 74/0833; H04W 74/08; H04W 74/0866; H04L 1/0003; H04L 1/0001; H04L 1/0002; H04L 1/0004; H04L 1/0005; H04L 1/0006; H04L 1/0009; H04L 1/001; H04L 1/0011
  See application file for complete search history.

(56) References Cited

U.S. PATENT DOCUMENTS

2011/0216677 A1    9/2011   Ahmadi et al.
2012/0020433 A1    1/2012   Bhattad et al.
(Continued)

FOREIGN PATENT DOCUMENTS

CN     101567772 A     10/2009
CN     102118234 A     7/2011
(Continued)

OTHER PUBLICATIONS

CN Office Action in Application No. 201810858499.8 dated Aug. 9, 2021.
(Continued)

*Primary Examiner* — Phong La
(74) *Attorney, Agent, or Firm* — Brooks Kushman P.C.

(57) ABSTRACT

Provided are a random access method, a terminal device and a network device. The random access method includes transmitting a random access message 1. A payload part is carried in the random access message 1, and the payload part is acquired through performing modulation and coding according to a target MCS.

20 Claims, 2 Drawing Sheets

--- transmitting a random access message 1, wherein a payload part is carried in the random access message 1, and the payload part is acquired through performing modulation and coding according to a target MCS    101

(56) References Cited

U.S. PATENT DOCUMENTS

| | | | |
|---|---|---|---|
| 2012/0210786 | A1 | 8/2012 | Steinbrink et al. |
| 2014/0226608 | A1 | 8/2014 | Seo et al. |
| 2015/0067082 | A1 | 3/2015 | Engelhart |
| 2016/0352454 | A1 | 12/2016 | Zhang et al. |
| 2017/0318575 | A1 | 11/2017 | Park et al. |
| 2018/0006790 | A1 | 1/2018 | Park et al. |
| 2018/0035406 | A1 | 2/2018 | Hao et al. |
| 2018/0098359 | A1* | 4/2018 | Patel .................... H04L 5/0048 |
| 2018/0205516 | A1 | 7/2018 | Jung et al. |
| 2018/0248595 | A1 | 8/2018 | Chae et al. |
| 2018/0288746 | A1* | 10/2018 | Zhang .................. H04L 1/0031 |
| 2018/0368108 | A1* | 12/2018 | Zeng ..................... H04L 1/0009 |
| 2019/0021076 | A1 | 1/2019 | Zhang et al. |
| 2019/0223201 | A1* | 7/2019 | Lee ....................... H04L 5/0053 |
| 2019/0342921 | A1* | 11/2019 | Loehr ................... H04L 5/0053 |
| 2019/0357174 | A1 | 11/2019 | Zhao et al. |
| 2020/0008270 | A1* | 1/2020 | Zhang .................. H04L 1/0004 |
| 2020/0092685 | A1* | 3/2020 | Fehrenbach .......... H04W 72/23 |
| 2020/0314820 | A1* | 10/2020 | Kim .................. H04W 72/0453 |
| 2022/0248291 | A1* | 8/2022 | Park ....................... H04W 36/26 |
| 2023/0113640 | A1* | 4/2023 | Zhou ..................... H04W 76/27 |
| | | | 370/225 |

FOREIGN PATENT DOCUMENTS

| | | | |
|---|---|---|---|
| CN | 102687444 | A | 9/2012 |
| CN | 102714530 | A | 10/2012 |
| CN | 106961713 | A | 7/2017 |
| CN | 107005374 | A | 8/2017 |
| CN | 107078889 | A | 8/2017 |
| CN | 107196743 | A | 9/2017 |
| CN | 107210889 | A | 9/2017 |
| CN | 107615693 | A | 1/2018 |
| CN | 107666364 | A | 2/2018 |
| CN | 108200649 | A | 6/2018 |
| CN | 108282301 | A | 7/2018 |
| CN | 108282900 | A | 7/2018 |
| IN | 102469615 | A | 5/2012 |
| KR | 20120139772 | A | 12/2012 |
| WO | 2018/132843 | A1 | 7/2018 |

OTHER PUBLICATIONS

EP Search Report in Application No. 19844628.8 dated Jul. 29, 2021.

"Support of link adaptation for UL grant-free NOMA schemes" 3GPP TSG-RAN WG1 #86bis, Intel Corporation, R1-1610374, Oct. 10, 2018.

"On 2-step Random Access Procedure" 3GPP TSG-RAN WG1 AH_NR Meeting, Nokia, Alcatel-Lucent Shanghai Bell, R1-1700652, Jan. 16, 2017.

CN Office Action in Application No. 201810858499.8 dated Jan. 25, 2021.

"2-step Random Access Procedure", ZTE, ZTE Microelectronics, 3GPP TSG RAN WG1 AH-NR Meeting, R1-1700105, Jan. 16, 2017.

"Discussions on 2 Steps RACH Procedure", Sony, 3GPP TSG RAN WG1 Meeting AH_NR Meeting, R1-1700668, Jan. 16, 2017.

Written Opinion and International Search Report in Application No. PCT/CN2019/096505 dated Feb. 11, 2021.

JP Office Action in Application No. 2021-504527 dated Apr. 19, 2022.

KR Office Action in Application No. 10-2021-7005256 dated Mar. 18, 2022.

"Random Access Procedure" 3GPP TSG-RAN WG1 #87, R1-1612311, InterDigital Communications, Nov. 14, 2016.

Second Office Action for European Application No. 19 844 628.8 dated Dec. 22, 2023, 6 Pages.

* cited by examiner transmitting a random access message 1, wherein a payload part is carried in the random access message 1, and the payload part is acquired through performing modulation and coding according to a target MCS — 101

Fig.1 receiving a random access message 1, wherein a payload part is carried in the random access message 1, and the payload part is acquired through performing modulation and coding according to a target MCS — 201

Fig.2

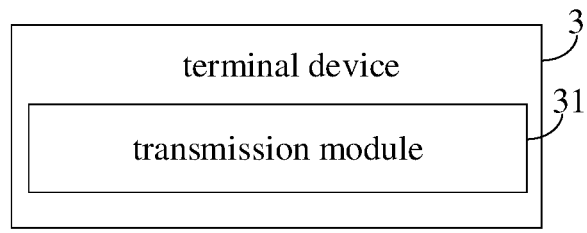

Fig.3

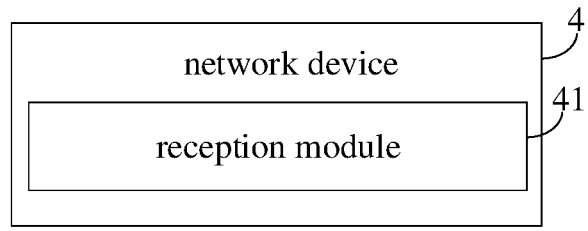

Fig.4

RANDOM ACCESS METHOD, TERMINAL DEVICE AND NETWORK DEVICE

CROSS-REFERENCE TO RELATED APPLICATION

The present application is a continuation of PCT Application No. PCT/CN2019/096505 filed on Jul. 18, 2019, which claims a priority of the Chinese patent application No. 201810858499.8 filed in China on Jul. 31, 2018, which are incorporated herein by reference in their entireties.

TECHNICAL FIELD

The present disclosure relates to the field of communications technology, in particular to a random access method, a terminal device and a network device.

BACKGROUND

As compared with a mobile communications system in related art, a $5^{th}$-generation ($5^{th}$-Generation, 5G) mobile communications system needs to be adapted to more diversified scenarios and service requirements. Principal scenarios of new radio (New Radio, NR) include enhanced mobile broadband (enhanced Mobile Broadband, eMBB), massive machine type of communication (massive Machine Type of Communication, mMTC) and ultra-reliable low latency communications (Ultra-Reliable low Latency Communications, URLLC), and a corresponding system is highly demanded in these scenarios in terms of high reliability, low latency, large broadband, wide coverage, and the like.

In a conventional uplink transmission mode, when uplink data is to be transmitted, at first a terminal device, e.g., a user equipment (User Equipment, UE), needs to acquire uplink timing synchronization through a random access process, i.e., acquire uplink timing advance (Timing Advance, TA) information from a network side. Upon the acquisition of the uplink timing synchronization, the UE may transmit the uplink data through dynamic grant or semi-static grant.

When an uplink data packet is relatively small, the transmission of the uplink data after the acquisition of the uplink timing synchronization through the random access process may lead to the consumption of resources and electric power. Hence, in the mMTC scenario, the UE may transmit the uplink data in a nonsynchronous state. Similar to the random access process, the UE may also be in the nonsynchronous state during the transmission of preamble. However, a cyclic prefix (Cyclic Prefix, CP) needs to be added into the preamble so as to cancel out the influence caused by a transmission delay.

In the NR system, as configured by a network device, e.g., a base station, there is a plurality of frequency division multiplexing (Frequency Division Multiplexing, FDM) physical random access channel (Physical Random Access Channel, PRACH) transmission occasions at one time instance (i.e., a duration desired for transmitting one PRACH resource, or a time-domain position for the transmission of a PRACH). The PRACH transmission occasion may also be called as a PRACH occasion, RO for short. The quantity of ROs for FDM at one time instance may be {1,2,4,8}.

Usually, the random access preamble is merely capable of being transmitted on a time-domain resource configured through a parameter PRACHConfigurationIndex, and the random access preamble is merely capable of being transmitted on a frequency-domain resource configured through a parameter prach-FDM. PRACH frequency-domain resource may be represented as $n_{RA} \in \{0, 1, \ldots, M-1\}$, where M is equal to the high-layer parameter prach-FDM. At the initial access, the PRACH frequency-domain resources $n_{RA}$ may be numbered in an ascending order starting from an RO resource with a lowest frequency in an initial active uplink bandwidth part. Otherwise, the PRACH frequency-domain resources $n_{RA}$ may be numbered in an ascending manner starting from an RO resource with a lowest frequency in an active uplink bandwidth part.

Currently, during the transmission of a message MSG1 for 2-step RACH, the UE may transmit the preamble and a payload part simultaneously, and the payload part may be, e.g., uplink data and/or control information. The UE needs to modulate and encode the payload part. However, there is currently no definite scheme about how to modulate and encode the payload part carried in the MSG1, so it is impossible to ensure the validity and reliability of the communications.

SUMMARY

An embodiment of the present disclosure is to provide a random access method, a terminal device and a network device, so as to solve the problem that there is currently no definite scheme about how to modulate and encode a payload part carried in a message in a random access process.

In order to solve the above-mentioned problem, in a first aspect, the present disclosure provides in some embodiments a random access method for a terminal device, including transmitting a random access message 1. A payload part is carried in the random access message 1, and the payload part is acquired through performing modulation and coding according to a target MCS.

In a second aspect, the present disclosure provides in some embodiments a random access method for a network device, including receiving a random access message 1. A payload part is carried in the random access message 1, and the payload part is acquired through performing modulation and coding according to a target MCS.

In a third aspect, the present disclosure provides in some embodiments a terminal device, including a transmission module configured to transmit a random access message 1. A payload part is carried in the random access message 1, and the payload part is acquired through performing modulation and coding according to a target MCS.

In a fourth aspect, the present disclosure provides in some embodiments a network device, including a reception module configured to receive a random access message 1. A payload part is carried in the random access message 1, and the payload part is acquired through performing modulation and coding according to a target MCS.

In a fifth aspect, the present disclosure provides in some embodiments a communication device, including a memory, a processor, and a computer program stored in the memory and capable of being executed by the processor. The computer program is configured to be executed by the processor to implement the step of the above-mentioned random access method for the terminal device, or implement the step of the above-mentioned random access method for the network device. Optionally, the communication device is a terminal device or a network device.

In a sixth aspect, the present disclosure provides in some embodiments a computer-readable storage medium storing therein a computer program. The computer program is configured to be executed by a processor to implement the step of the above-mentioned random access method for the terminal device, or implement the step of the above-mentioned random access method for the network device.

According to the embodiments of the present disclosure, the modulation and coding may be performed on the payload part carried in the random access message 1 according to the target MCS, so it is able to specify how to modulate and code the payload part carried in the random access message 1 in a random access process, thereby to enable the payload part to be accurately received by a network side, reduce the complexity in the reception and processing at the network side, and ensure the validity and reliability of the communications.

BRIEF DESCRIPTION OF THE DRAWINGS

In order to illustrate the technical solutions of the embodiments of the present disclosure in a clearer manner, the drawings desired for the embodiments of the present disclosure will be described hereinafter briefly. Obviously, the following drawings merely relate to some embodiments of the present disclosure, and based on these drawings, a person skilled in the art may obtain the other drawings without any creative effort.

FIG. 1 is a flow chart of a random access method according to an embodiment of the present disclosure;

FIG. 2 is a flow chart of another random access method according to an embodiment of the present disclosure;

FIG. 3 is a structural schematic view of a terminal device according to an embodiment of the present disclosure;

FIG. 4 is a structural schematic view of a network device according to an embodiment of the present disclosure;

DETAILED DESCRIPTION

Figure 5:
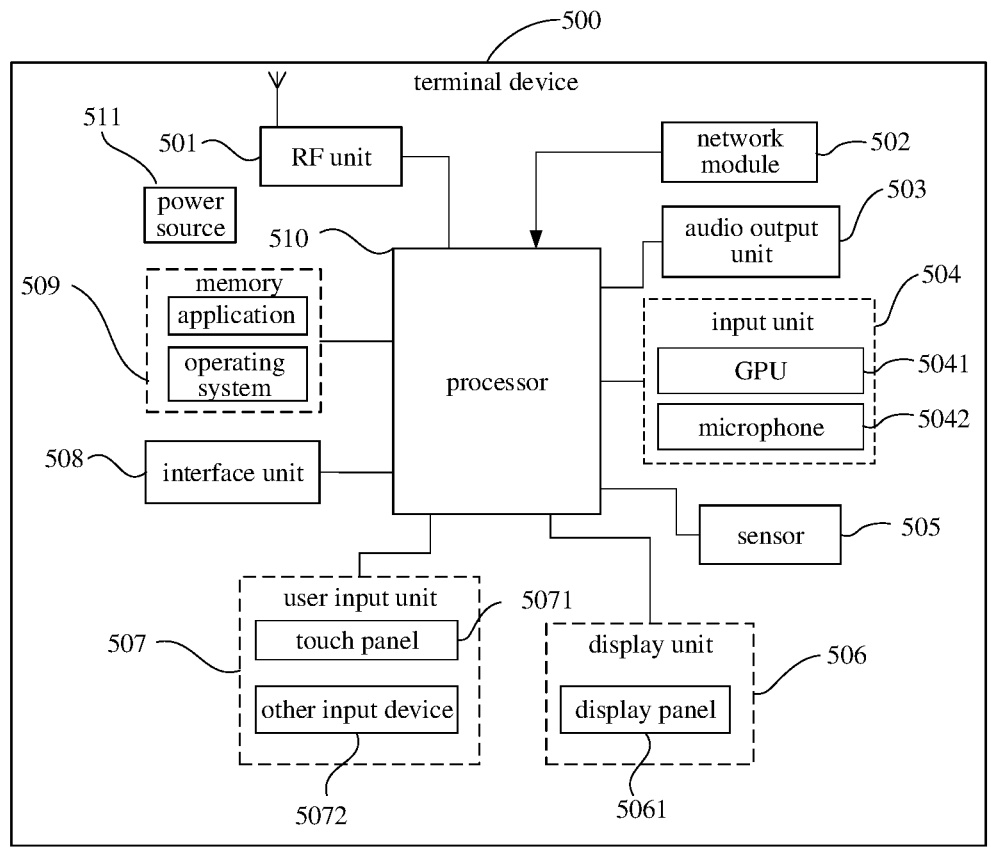
FIG. 5 is another structural schematic view of a terminal device according to an embodiment of the present disclosure.

In order to illustrate the technical solutions of the embodiments of the present disclosure in a clearer manner, the drawings desired for the embodiments of the present disclosure will be described hereinafter briefly. Obviously, the following drawings merely relate to some embodiments of the present disclosure, and based on these drawings, a person skilled in the art may obtain the other drawings without any creative effort.

Such terms as "first" and "second" involved in the specification and the appended claims are merely used to differentiate similar objects rather than to represent any specific order. It should be appreciated that, the data used in this way may be replaced with each other in an appropriate circumstance, so as to implement the embodiments in an order other than that shown in the drawings or described in the specification. In addition, the terms "including" and "having" and any variations thereof are intended to cover non-exclusive inclusions. For example, a process, method, system, product, or device that includes a series of steps or units is not necessarily limited to the steps and units that are clearly listed. Instead, these steps or units may include other steps or units that are not clearly listed or are inherent to the process, method, product, or device. The expression "and/ or" involved in the specification and claims may represent at least one of related objects.

The technology described in the context shall not be limited to a long term evolution (Long Term Evolution, LTE)/LTE-advanced (LTE-Advanced, LTE-A) system, and it may also be applied to various wireless communication systems, e.g., code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-Carrier Frequency-Division Multiple Access, SC-FDMA), or other systems. The terms "system" and "network" may be replaced with each other. The CDMA system may be used to implement such radio technologies as CDMA2000 and universal terrestrial radio access (Universal Terrestrial Radio Access, UTRA). The UTRA may include wideband code division multiple access (Wideband Code Division Multiple Access, WCDMA) and the other CDMA variants. The TDMA system may be used to implement such a radio technology as global system for mobile communication (Global System for Mobile Communication, GSM). The OFDMA system may be used to implement such radio technologies as ultra mobile broadband (Ultra Mobile Broadband, UMB), evolved-UTRA (Evolution-UTRA, E-UTRA), IEEE 802.11 (Wi-Fi), IEEE 802.16 (WiMAX), IEEE 802.20, and Flash-OFDM. The UTRA and the E-UTRA are parts of a universal mobile telecommunications system (Universal Mobile Telecommunications System, UMTS). The LTE and a more advanced LTE (e.g., LTE-A) are new UMTS versions using the E-UTRA. The UTRA, E-UTRA, UMTS, LTE, LTE-A and GSM have been described in literatures from the $3^{rd}$-generation partnership project ($3^{rd}$-Generation Partnership Project, 3GPP). The CDMA200 and UMB have been described in literatures from the $3^{rd}$-generation partnership project 2 (3GPP2). The technology described in the context may be applied to the above-mentioned systems and radio technologies, or applied to the other systems and radio technologies. However, an NR system has been described illustratively hereinafter, and terms for the NR system have been used in most of the description. It should be appreciated that, the embodiments are provided for illustrative purposes only, but shall not be construed as limitation, i.e., the schemes in the embodiments of the present disclosure may also be applied to an systems other than the NR system.

The following description is given for illustrative purposes but shall not be construed as limiting the scope, applicability or configuration set forth in claims. Any alterations may be made on functions and arrangements of the discussed elements without departing from the spirit and scope of the present disclosure. Various procedures or assemblies may be omitted, replaced or added appropriately in the examples. For example, the described method may be performed in an order different from that described in the context, and some steps may be added, omitted or combined. In addition, the features described with reference to some examples may be combined in the other examples.

A wireless communications system in the embodiments of the present disclosure includes a terminal device and a network device. The terminal device may also be called as a terminal or user equipment (User Equipment, UE), and the terminal device may be a mobile phone, a tablet personal computer, a laptop computer, a personal digital assistant (Personal Digital Assistant, PDA), a mobile Internet device (Mobile Internet Device, MID), a wearable device, a vehicle-mounted device, or the like. It should be appreciated that, the specific type of the terminal device will not be particularly defined herein. The network device may be a base station or a core network. The base station may be a 5G base station or a newer version of base station (e.g., gNB, or 5G NR NB), or a base station in the other communications system (e.g., eNB, WLAN access point, or another access point). The base station may be called as node B, evolved node B, access point, base transceiver station (Base Transceiver Station, BTS), radio base station, radio transceiver, basic service set (Basic Service Set, BSS), extended service set (Extended service Set, ESS), node B, evolved node B (eNB), home node B, evolved home node B WLAN access point, WiFi node or another appropriate term in the field. The base station shall not be limited to a specific technical term, as long as a same technical effect is achieved. It should be appreciated that, merely the base station in an NR system is taken as an example in the embodiments of the present disclosure, but a specific type of the base station will not be particularly defined herein.

As shown in FIG. 1, the present disclosure provides in some embodiments a random access method for a terminal device, which includes Step 101 of transmitting a random access message 1, wherein a payload part is carried in the random access message 1, and the payload part is acquired through performing modulation and coding according to a target MCS.

It should be appreciated that, the random access message 1 may be specifically a message in a random access process. Optionally, the random access message 1 may be a request message in a 2-step RACH process, e.g., Msg1.

A preamble and the payload part may be carried in the random access message 1, and the payload part may include uplink data and/or control information. The payload part may be carried by a data channel, a control channel and/or another channel. For example, the uplink data in the payload part may be carried by a physical uplink shared channel (Physical Uplink Shared Channel, PUSCH), and the control information in the payload part may be carried by a physical uplink control channel (Physical Uplink Control Channel, PUCCH), or the control information and the uplink data may be multiplexed to be both carried by the PUSCH.

In a possible embodiment of the present disclosure, the target modulation and coding scheme (Modulation and Coding Scheme, MCS) may be agreed in a protocol, or configured by a network device. To be specific, the target MCS may be a predefined MCS, or an MCS indicated (by the network device) through a system broadcasting message or high-layer signaling.

It should be appreciated that, prior to performing the modulation and coding on the payload part in the Msg1 according to the target MCS, the terminal device may at first receive from the network device a MCS configured for the terminal device. When the network device does not configure any MCS for the terminal device, the terminal device may adopt a default MCS, i.e., the predefined MCS. In some scenarios, when it is pre-agreed that the network device does not configure the MCS for the terminal device, the terminal device may directly adopt the predefined MCS to perform the modulation and coding on the payload part in the Msg1.

According to the random access method in the embodiments of the present disclosure, the modulation and coding may be performed on the payload part carried in the random access message 1 according to the target MCS, so it is able to specify how to modulate and code the payload part carried in the random access message 1 in a random access process, thereby to enable the payload part to be accurately received by a network side, reduce the complexity in the reception and processing at the network side, and ensure the validity and reliability of the communications.

In the embodiments of the present disclosure, apart from that mentioned hereinabove, the target MCS may also be determined and selected by the terminal device itself from an MCS set. The MCS set may be agreed in a protocol, or configured by the network device. To be specific, prior to Step 101, the random access method may further include: acquiring, by the terminal device, the MCS set; and selecting, by the terminal device, the target MCS from the MCS set.

The MCS set may be a predefined MCS set, or an MCS set indicated (by the network device) through a system broadcasting message or high-layer signaling.

A procedure of selecting, by the terminal device, the target MCS from the MCS set will be described as follows. The terminal device may select the target MCS from the MCS set according to a signal measurement result and/or a payload size of a 2-step RACH request message.

In a possible embodiment of the present disclosure, the signal measurement result may be at least one of: reference signal receiving power (Reference Signal Receiving Power, RSRP), reference signal receiving quality (Reference Signal Receiving Quality, RSRQ), and received signal strength indication (Received Signal Strength Indication, RSSI). It should be appreciated that, when the payload part is a data part, the corresponding payload size may be a size of a transport block (Transport Block, TB).

For example, in actual use, the network device may configure for the terminal device a threshold for selecting the MCS according to the signal measurement result, e.g., the RSRP. In this way, when selecting the MCS from the MCS set, the terminal device may select a matching MCS according to the threshold. For example, when the target MCS is selected according to the RSRP, and the MCSs included in the MCS set are MCS1, MCS2 and MCS3, the network device may configure X1 and X2 as thresholds for the RSRP, so that the terminal device may select the target MCS according to a correspondence as shown in Table 1.

TABLE 1

| RSRP value | Target MCS |
| --- | --- |
| RSRP < X1 | MCS1 |
| X1 <= RSRP < X2 | MCS2 |
| X2 <= RSRP | MCS3 |

For another example, in actual use, the network device may configure for the terminal device a threshold for selecting the MCS according to the payload size. In this way, when selecting the MCS from the MCS set, the terminal device may select a matching MCS according to the threshold.

For example, when selecting the target MCS according to the payload size, and the MCSs included in the MCS set are MCS4, MCS5 and MCS6, the network device may configure X3 and X4 as thresholds of the payload size, so that the terminal device may select the target MCS according to a correspondence as shown in Table 2.

TABLE 2

| Payload size | Target MCS |
| --- | --- |
| Payload size < X3 | MCS4 |
| X3 <= Payload size < X4 | MCS5 |
| X4 <= Payload size | MCS6 |

It should be appreciated that, based on the above instance for selecting the target MCS according to the RSRP and the above instance for selecting the target MCS according to the payload size, when the signal measurement result and the payload size are adopted, the terminal device may also select a matching MCS according to the thresholds configured by the network device (including the threshold of the signal measurement result and the threshold of the payload size), the relevant correspondences, as well as the signal measurement result and the payload size, which will not be further particularly defined herein.

In the embodiments of the present disclosure, when the target MCS is selected from the MCS set, in order to enable the network device to know the target MCS and correctly process the random access message 1, the terminal device may notify the target MCS to the network device through relevant information about the random access message 1 while transmitting the random access message 1.

To be specific, uplink control information (Uplink Control Information, UCI) for explicitly indicating the target MCS may be carried in the random access message 1.

It should be appreciated that, the UCI may be modulated and coded using a predefined MCS or an MCS configured by the network device. The UCI may be carried in a control channel or a data channel of the payload part, and transmitted together with the payload part. In addition, the UCI may use a modulation and coding mode different from a data part in the payload part, and the UCI and the data part may each be encoded separately. It should be appreciated that, during the implementation, apart from explicitly indicating the target MCS, the UCI may also be used to indicate the other information, which will not be further particularly defined herein.

Alternatively, a demodulation reference signal (Demodulation Reference Signal, DMRS) for implicitly indicating the target MCS may be carried in the random access message 1.

It should be appreciated that, a configuration parameter of the DMRS may be configured by the network device, and include a plurality of DMRS configurations or a plurality of DMRS sequences. In a possible embodiment of the present disclosure, when the configuration parameter of the DMRS includes number a of DMRS configurations, one or number b of DMRS configurations may be associated with one MCS in the MCS set. Alternatively, when the configuration parameter of the DMRS includes number c of DMRS sequences, one or number d of DMRS sequences may be associated with one MCS in the MCS set. Here, the number a, the number b, the number c and the number d are each a positive integer greater than 1, the number b is smaller than or equal to the number a, and the number d is smaller than or equal to the number c.

It should be appreciated that, the DMRS configuration included in the configuration parameter of the DMRS may be specifically a DMRS port or a DMRS time-domain resource, or a DMRS port or a DMRS frequency-domain resource.

For example, when the target MCS is indicated by the terminal device through the DMRS carried in the random access message 1, DMRS sequences 1, 2 and 3 have been configured, and the MCSs included in the MCS set are MCS1, MCS2 and MCS3 (it should be appreciated that, the quantity of the DMRS sequences may not necessarily be equal to the quantity of the MCSs in the MCS set, and merely an instance where the quantities are the same is shown here), a correspondence between the DMRS sequences and the target MCSs may be shown in Table 3.

TABLE 3

| DMRS sequence | Target MCS |
| --- | --- |
| DMRS sequence 1 | MCS1 |
| DMRS sequence 2 | MCS2 |
| DMRS sequence 3 | MCS3 |

Alternatively, preambles may be carried in the random access message 1, and the preambles and/or PRACH occasions corresponding to the preambles may be used to implicitly indicate the target MCS.

It should be appreciated that, an association relationship between the preamble and the target MCS may be configured by the network device, and one or more preambles may be associated with one MCS in the MCS set. An association relationship between the PRACH occasions and the target MCS may be configured by the network device, and one or more PRACH occasions may be associated with one MCS in the MCS set.

A random access process will be described hereinafter in conjunction with the embodiments.

In a possible embodiment of the present disclosure, before 2-step RACH, the UE may at first measure a synchronization/PBCH block (Synchronization/PBCH block, SS block), and report measurement reports, e.g., RSRP, RSRQ and/or RSSI. Upon the receipt of the measurement reports reported by the UE, the network device, e.g., a base station, may configure an MCS or an MCS set for the UE according to the measurement reports, so that the UE may modulate and code the payload part carried in an MSG1 in the 2-step RACH according to the MCS or MCS set.

In another possible embodiment of the present disclosure, a configuration for transmitting the MSG1 acquired by the UE from a network side may include at least one of:
  a configuration parameter of a PRACH, wherein the configuration parameter may include a preamble format, and a time/frequency-domain resource, and may be used to process the preamble carried in the MSG1;
  a configuration parameter of a payload part, wherein the configuration parameter may include number N of MCSs, and when the configuration parameter is not provided, the UE may use a default MCS or a default MCS set;
  a configuration parameter when the UCI is transmitted on a PUSCH, wherein the configuration parameter may include a value of beta, a code rate, a modulation mode, and a time/frequency-domain resource, and when the configuration parameter is not provided, the UE may use a default parameter of the UCI.

Based on the above configurations, the UE may transmit a corresponding MSG1. In addition, when N=1, the UE may modulate and code the payload part carried in the MSG1 according to the MCS. When N>1, the UE may determine an appropriate MCS according to a signal (RSRP, RSRQ and/or RSSI) measurement result and/or a payload size of the MSG1, and modulate and code the payload part carried in the MSG1 according to the determined MCS. Further, when transmitting the MSG1, the UE may explicitly indicate, through the UCI, the used MCS according to the configuration parameter or default parameter of the UCI.

In another possible embodiment of the present disclosure, a configuration for transmitting the MSG1 acquired by the UE from the network side may include at least one of:
  a configuration parameter of a PRACH, wherein the configuration parameter may include a preamble format and a time/frequency-domain resource, and may be used to process the preamble carried in the MSG1;

a configuration parameter of a payload part, wherein the configuration parameter may include number N of MCSs, wherein when the configuration parameter is not provided, the UE may use a default MCS or a default MCS set.

a configuration parameter of a DMRS, wherein the configuration parameter may include number M1 of DMRS configurations, or number M2 of DMRS sequences. When the configuration parameter includes number M1 of DMRS configurations, number N of MCSs may be associated with the number M1 of DMRS configurations, e.g., an MCS n may correspond to a DMRS configuration m1, where m1 is equal to M1 mod N, and mod represents a remainder function. When the configuration parameter includes number M2 of DMRS sequences, the number N of MCSs may be associated with the number M2 of DMRS sequences, e.g., the MCS n may correspond to a DMRS sequence m2, where m2 is equal to M2 mod N, and mod represents a remainder function. Here, M1 and M2 are each a positive integer greater than 1, m1 is smaller than or equal to M1, m2 is smaller than or equal to M2, and 0≤n≤N−1, wherein when the configuration parameter is not provided, the UE may use a default parameter of the DMRS.

Based on the above configurations, the UE may transmit the corresponding MSG1. In addition, when N=1, the UE may modulate and code the payload part carried in the MSG1 according to the MCS. When N>1, the UE may determine an appropriate MCS according to a signal (RSRP, RSRQ and/or RSSI) measurement result and/or a payload size of the MSG1, and modulate and code the payload part carried in the MSG1 according to the determined MCS. Further, when transmitting the MSG1, the UE may select a corresponding DMRS according to the configuration parameter or default parameter of the DMRS, so as to implicitly indicate the used MCS.

In yet another possible embodiment of the present disclosure, a configuration for transmitting the MSG1 acquired by the UE from the network side may include at least one:

a configuration parameter of a PRACH, wherein the configuration parameter may include a preamble format and a time/frequency-domain resource, and may be used to process the preamble carried in the MSG1.

a configuration parameter of a payload part, wherein the configuration parameter may include number N of MCSs, wherein when the configuration parameter is not provided, the UE may use a default MCS or a default MCS set.

an association relationship between preambles and MCSs and/or association relationship between PRACH occasions and MCSs, wherein for example, every number M of MCSs may be associated with one PRACH occasions, and/or number R of contention-based (Contention-Based, CB) preambles may be associated with each MCS. To be specific, number R of CB preambles which are consecutively numbered may be associated with an MCS n at each PRACH occasion, where 0≤n≤N−1. The preambles are indexed from n*64/N.

For example, in the case of configuring the association relationship between the PRACH occasions and the MCSs, when M=¼, one MCS may be associated with four PRACH occasions, and when M=2, two MCSs may be associated with one PRACH occasion.

For another example, in the case of configuring the association relationship between the preambles and the MCSs, when R=8, each MCS may be associated with eight CB preambles, and when R=4, each MCS may be associated with four CB preambles.

For yet another example, when configuring the association relationship among the MCSs and the preambles and the PRACH occasions, the quantity of CB preambles at each PRACH occasion may be R*max(1,M). When N=4, M=¼ and R=8, the quantity of the CB preambles at each PRACH occasion may be R*max(1,M)=8, and four PRACH occasions may be associated with one MCS. In these four PRACH occasions, eight CB preambles at each PRACH occasion may be associated with the MCS. To be specific, when four FDM PRACH occasions are provided at each PRACH transmission time and four PRACH transmission times are provided within one PRACH slot, an MCS0 may be associated with four FDM PRACH occasions at a PRACH transmission time 1, an MCS1 may be associated with four FDM PRACH occasions at a PRACH transmission time 2, and so on. In this instance, the CB preambles at each PRACH occasion may be associated with one MCS.

Alternatively, when N=8, M=2 and R=4, the quantity of the CB preambles at each PRACH occasion may be R*max(1,M)=8, and one PRACH occasion may be associated with two MCSs. At each PRACH occasion, each MCS may be associated with four CB preambles. To be specific, when two FDM PRACH occasions are provided at each PRACH transmission time and two PRACH transmission times are provided within one PRACH slot, MCSs 0-1 may be associated with an FDM PRACH occasion 1 at a PRACH transmission time 1, and MCSs 2-3 may be associated with an FDM PRACH occasion 2 at the PRACH transmission time 1. At the PRACH occasion 1, preambles 0-3 may be associated with the MCS 0, and preambles 4-7 may be associated with the MCS 1. At the PRACH occasion 2, preambles 8-11 may be associated with the MCS2, and preambles 12-15 may be associated with the MCS3. Similarly, there may exist an identical correspondence between the preambles and the MCSs at two FDM PRACH occasions of a PRACH transmission time 2.

Alternatively, when N=4, M=¼ and R=8, the quantity of CB preambles at each PRACH occasion may be R*max(1, M)=8, and four PRACH occasions may be associated with one MCS. At these four PRACH occasions, eight CB preambles at each PRACH occasion may be associated with the MCS. To be specific, when four FDM PRACH occasions are provided at each PRACH transmission time and two PRACH transmission times are provided within one PRACH slot, MCS 0 may be associated with four PRACH occasions of a PRACH transmission time 1 within a PRACH slot 1, MCS 1 may be associated with four PRACH occasions of a PRACH transmission time 2 within the PRACH slot 1, MCS 2 may be associated with four PRACH occasions of a PRACH transmission time 1 within a PRACH slot 2, and MCS 3 may be associated with four PRACH occasions of a PRACH transmission time 2 within the PRACH slot 2.

It should be appreciated that, the MCS may be associated with the PRACH occasion in the following sequence. At first, the MCS may be associated with a plurality of preambles at one PRACH occasion in an ascending or descending order of preamble indices. Next, the MCS may be associated with a plurality of FDM PRACH occasions in an ascending or descending order of frequency resource indices. Then, the MCS may be associated with a plurality of TDM PRACH occasions within one PRACH slot in an ascending or descending order of time resource indices. Finally, the MCS may be associated with a plurality of PRACH occasions in an ascending order of PRACH slots.

Based on the above configurations, the UE may transmit the corresponding MSG1. In addition, when N=1, the UE may modulate and code the payload part carried in the MSG1 according to the MCS. When N>1, the UE may determine an appropriate MCS according to a signal (RSRP, RSRQ and/or RSSI) measurement result and/or a payload size of the MSG1, and modulate and code the payload part carried in the MSG1 according to the determined MCS. Further, when transmitting the MSG1, the UE may implicitly indicate the used MCS through the preamble carried in the MSG1 and/or the PRACH occasion corresponding to the preamble.

As shown in FIG. 2, the present disclosure further provides in some embodiments a random access method for a network device, which includes Step 201 of receiving a random access message 1, wherein a payload part is carried in the random access message 1, and the payload part is acquired through performing modulation and coding according to a target MCS.

It should be appreciated that, the random access message 1 may be specifically a message in a random access process. Optionally, the random access message 1 may be a request message in a 2-step RACH process, e.g., Msg1.

A preamble and the payload part may be carried in the random access message 1, and the payload part may include uplink data and/or control information. The payload part may be carried by a data channel, a control channel and/or the other channel. For example, the uplink data in the payload part may be carried by a PUSCH, and the control information in the payload part may be carried by a PUCCH.

In the embodiments of the present disclosure, the random access message 1 may be received from the terminal device, and the modulation and coding may be performed on the payload part carried in the random access message 1 according to the target MCS, so it is able to specify how to modulate and code the payload part carried in the random access message 1 in a random access process, thereby to enable the payload part to be accurately received by a network side, reduce the complexity in the reception and processing at the network side, and ensure the validity and reliability of the communications.

In an embodiment of the present disclosure, optionally, when the target MCS is selected from an MCS set, subsequent to receiving the random access message 1, the random access method may further include any one of: acquiring the target MCS according to UCI carried in the random access message 1; acquiring the target MCS according to a DMRS carried in the random access message 1; and acquiring the target MCS according to a preamble carried in the random access message 1 and/or a PRACH occasion corresponding to the preamble. The UCI may be used to explicitly indicate the target MCS, the DMRS may be used to implicitly indicate the target MCS, and the preamble and/or the PRACH occasion corresponding to the preamble may be used to implicitly indicate the target MCS.

In this way, upon the acquisition of the target MCS, the payload part carried in the received random access message 1 may be demodulated and decoded according to the target MCS, so as to ensure the reception and processing accuracy.

The random access methods have been described hereinabove, and the terminal device and the network device will be described hereinafter in conjunction with the drawings and embodiments.

As shown in FIG. 3, the present disclosure further provides in some embodiments a terminal device 3, which includes a transmission module 31 configured to transmit a random access message 1. A payload part is carried in the random access message 1, and the payload part is acquired through performing modulation and coding according to a target MCS.

According to the terminal device in the embodiments of the present disclosure, the modulation and coding may be performed on the payload part carried in the random access message 1 according to the target MCS, so it is able to specify how to modulate and code the payload part carried in the random access message 1 in a random access process, thereby to enable the payload part to be accurately received by a network side, reduce the complexity in the reception and processing at the network side, and ensure the validity and reliability of the communications.

In the embodiment of the present disclosure, optionally, the target MCS may be a predefined MCS, or an MCS indicated by a system broadcasting message or high-layer signaling.

Optionally, the terminal device 3 may further include: a first acquisition module configured to acquire an MCS set; and a selection module configured to select the target MCS from the MCS set.

Optionally, the MCS set may be a predefined MCS set, or an MCS set indicated by a system broadcasting message or high-layer signaling.

Optionally, the selection module is specifically configured to select the target MCS from the MCS set according to a signal measurement result and/or a payload size of the random access message 1.

Optionally, UCI may be carried in the random access message 1 and used to explicitly indicate the target MCS; or a DMRS may be carried in the random access message 1 and used to implicitly indicate the target MCS; or a preamble may be carried in the random access message 1, and the preamble and/or a PRACH occasion corresponding to the preamble may be used to implicitly indicate the target MCS.

Optionally, the UCI may be modulated and coded using a predefined MCS or an MCS configured by a network device.

Optionally, a configuration parameter of the DMRS may be configured by the network device, and include a plurality of DMRS configurations or a plurality of DMRS sequences.

Optionally, when the configuration parameter of the DMRS includes number a of DMRS configurations, one or number b of DMRS configurations may be associated with one MCS in the MCS set; or when the configuration parameter of the DMRS includes number c of DMRS sequences, one or number d of DMRS sequences may be associated with one MCS in the MCS set, where the number a, the number b, the number c and the number d are each a positive integer greater than 1, the number b is smaller than or equal to the number a, and the number d is smaller than or equal to the number c.

Optionally, an association relationship between the preamble and the target MCS may be configured by the network device, and one or more preambles may be associated with one MCS in the MCS set.

Optionally, an association relationship between the PRACH occasion and the target MCS may be configured by the network device, and one or more PRACH occasions may be associated with one MCS in the MCS set.

As shown in FIG. 4, the present disclosure further provides in some embodiments a network device 4, which includes a reception module 41 configured to receive a random access message 1. A payload part is carried in the random access message 1, and the payload part is acquired through performing modulation and coding according to a target MCS.

According to the network device in the embodiments of the present disclosure, the random access message 1 may be received from the terminal device, and the modulation and coding may be performed according to the target MCS to acquire the payload part carried in the random access message 1, so it is able to specify how to modulate and code the payload part carried in the random access message 1 in a random access process, thereby to enable the payload part to be accurately received by a network side, reduce the complexity in the reception and processing at the network side, and ensure the validity and reliability of the communications.

In an embodiment of the present disclosure, optionally, the network device 4 may further include a second acquisition module configured to, when the target MCS is selected from an MCS set, perform any one of the following operations: acquiring the target MCS according to UCI carried in the random access message 1; acquiring the target MCS according to a DMRS carried in the random access message 1; and acquiring the target MCS according to a preamble carried in the random access message 1 and/or a PRACH occasion corresponding to the preamble. The UCI may be used to explicitly indicate the target MCS, the DMRS may be used to implicitly indicate the target MCS, and the preamble and/or the PRACH occasion corresponding to the preamble may be used to implicitly indicate the target MCS.

The present disclosure further provides in some embodiments a terminal device, which includes a processor, a memory, and a computer program stored in the memory and capable of being executed by the processor. The computer program is configured to be executed by the processor so as to implement the step of the above-mentioned random access method for the terminal device with a same technical effect, which will not be further particularly defined herein.

To be specific, FIG. 5 shows a hardware structure of the terminal device according to an embodiment of the present disclosure. The terminal device 500 may include, but not limited to, a radio frequency (RF) unit 501, a network module 502, an audio output unit 503, an input unit 504, a sensor 505, a display unit 506, a user input unit 507, an interface unit 508, a memory 509, a processor 510, and a power source 511. It should be appreciated that, the structure in FIG. 5 shall not be construed as limiting the terminal device. The terminal device may include more or fewer members, or some members may be combined, or the members may be arranged in different modes. In the embodiments of the present disclosure, the terminal device may include, but not limited to, mobile phone, tablet computer, notebook computer, personal digital assistant, vehicle-mounted terminal, wearable device or pedometer.

The radio frequency unit 501 is configured to transmit a random access message 1. A payload part may be carried in the random access message 1, and acquired through performing modulation and coding according to the MCS.

According to the terminal device 500 in the embodiments of the present disclosure, the modulation and coding may be performed on the payload part carried in the random access message 1 according to the target MCS, so it is able to specify how to modulate and code the payload part carried in the random access message 1 in a random access process, thereby to enable the payload part to be accurately received by a network side, reduce the complexity in the reception and processing at the network side, and ensure the validity and reliability of the communications.

It should be appreciated that, in the embodiments of the present disclosure, the radio frequency unit 501 may transmit and receive signals during the information transmission or phone call. To be specific, the radio frequency unit may, upon the receipt of downlink data from a base station, transmit the downlink data to the processor 510 for subsequent treatment. In addition, the radio frequency unit may transmit uplink data to the base station. Usually, the radio frequency unit 501 may include, but not limited to, an antenna, at least one amplifier, a transceiver, a coupler, a low-noise amplifier and a duplexer. In addition, the radio frequency unit 501 may communicate with a network and the other devices via a wireless communications system.

The network module 502 of the terminal device is configured to enable a user to access the broadband Internet in a wireless manner, e.g., help the user to receive and send an e-mail, browse a webpage or access a streaming media.

The audio output unit 503 is configured to convert audio data received by the radio frequency unit 501 or the network module 502, or audio data stored in the memory 509, into an audio signal and output the audio signal as a sound. In addition, the audio output unit 503 is further configured to provide an audio output related to a specific function executed by the terminal device 500 (e.g., a sound occurring when a calling signal or a message has been received). The audio output unit 503 may include a loudspeaker, a buzzer and a receiver.

The input unit 504 is configured to receive an audio or video signal. The input unit 504 may include a graphics processing unit (Graphics Processing Unit, GPU) 5041 and a microphone 5042. The GPU 5041 is configured to process image data of a static image or video acquired by an image collection unit (e.g., a camera) in a video capturing mode or an image capturing mode, and a processed image frame may be displayed by the display unit 506. The image frame processed by the GPU 5041 may be stored in the memory 509 (or another storage medium) or transmitted via the radio frequency unit 501 or network module 502. The microphone 5042 is configured to receive a sound, and convert the sound into audio data. In a telephone call mode, the processed audio data may be converted into data in a format capable of being transmitted by the radio frequency unit 501 to a mobile communications base station.

The terminal device 500 may further include at least one sensor 505, which may include a light sensor, a movement sensor and another sensors. To be specific, the light sensor may include an ambient light sensor or a proximity sensor. The ambient light sensor is configured to adjust a brightness value of a display panel 5061 according to ambient light. The proximity sensor is configured to turn off the display panel 5061 and/or a backlight source when the terminal device 500 is proximate to an ear of the user. As one of the movement sensors, an accelerometer may detect acceleration in various directions (usually a three-axis accelerometer), and detect a level and a direction of a gravity force when being in a static state. Through the accelerometer, it is able to identify a posture of the electronic device (e.g., perform a switching operation between portrait and landscape orientations, play relevant games, and calibrate a posture of a magnetometer), and implement vibration-identification-related functions (e.g., count steps and strikes). The sensor 505 may further include a fingerprint sensor, a pressure sensor, an iris sensor, a molecule sensor, a gyroscope, a barometer, a hygrometer, a thermometer or an infrared sensor, which will not be further particularly defined herein.

The display unit 506 is configured to display information inputted by the user or provided to the user. The display unit 506 may include the display panel 5061, e.g., a liquid crystal display (Liquid Crystal Display, LCD) panel, or an organic light-emitting diode (Organic Light-Emitting Diode, OLED) panel.

The user input unit 507 is configured to receive digital or character information inputted by the user, and generate a key signal input related to user settings and function control of the terminal device. To be specific, the user input unit 507 may include a touch panel 5071 and another input device 5072. The touch panel 5071, also called as touch screen, is configured to collect a touch operation made by the user on or in proximity to the touch panel 5071 (e.g., an operation made by the user through any appropriate object or attachment (e.g., finger or stylus) on or in the proximity to the touch panel 5071). The touch panel 5071 may include a touch detection device and a touch controller. The touch detection device is configured to detect a touch position of the user and a signal generated due to the touch operation, and transmit the signal to the touch controller. The touch controller is configured to receive touch information from the touch detection device, convert it into coordinates of a touch point, transmit the coordinates to the processor 510, and receive and execute a command from the processor 510. In addition, the touch panel 5071 may be of a resistive type, a capacitive type, an infrared type or a surface acoustic wave type. Besides the touch panel 5071, the user input unit 507 may further include the other input device 5072. The other input device 5072 may include, but not limited to, a physical keyboard, a functional button (e.g., a volume control button, an on/off button), a trackball, a mouse, and a joystick, which will not be further particularly defined herein.

Further, the touch panel 5071 may cover the display panel 5061. When the touch operation made on or in proximity to the touch panel 5071 has been detected, the touch panel 5071 may transmit the touch information to the processor 510, so as to determine a type of a touch event. Then, the processor 510 may control the display panel 5061 to provide a corresponding visual output according to the type of the touch event. Although the touch panel 5071 and the display panel 5061 are configured as two separate members for achieving the input and output functions of the terminal device in FIG. 5, in some embodiments of the present disclosure, they may be integrated so as to achieve the input and output functions of the terminal device, which will not be further particularly defined herein.

The interface unit 508 is configured to provide an interface between an external device and the terminal device 500. For example, the external device may include a wired or wireless headset port, an external power source port (or a battery charger port), a wired or wireless data port, a memory card port, a port for a device having an identification module, an audio input/output (I/O) port, a video I/O port, and an earphone port. The interface unit 508 is configured to receive an input from the external device (e.g., data information and electricity) and transmit the input to one or more elements of the terminal device 500, or transmit data between the terminal device 500 and the external device.

The memory 509 is configured to store therein a software application and various data. The memory 509 may mainly include an application storage area and a data storage area. An operating system and at least one application for the functions (e.g., an audio playing function, an image playing function) may be stored in the application storage area. Data created according to the operation of the mobile phone (e.g., audio data and phonebook) may be stored in the data storage area. In addition, the memory 509 may include a high-speed random access memory, or a non-volatile memory (e.g., at least one magnetic disk or flash memory), or another volatile solid state memory.

As a control center of the terminal device, the processor 510 may be connected to the other members of the terminal device via various interfaces and circuits, and configured to run or execute the software program and/or module stored in the memory 509, and call the data stored in the memory 509, so as to execute the functions of the terminal device and process the data, thereby to monitor the entire terminal device. The processor 510 may include one or more processing units. Optionally, an application processor and a modem may be integrated into the processor 510. The application processor is mainly configured to process the operating system, a user interface and the application. The modem is mainly configured to process wireless communication. It should be appreciated that, the modem may also not be integrated into the processor 510.

The terminal device 500 may further include the power source 511 (e.g., a battery) configured to supply power to the members of the terminal device 500. Optionally, the power source 511 is logically connected to the processor 510 via a power source management system, so as to achieve such functions as charging, discharging and power consumption management through the power source management system.

In addition, the terminal device 500 may further include some functional modules not shown in FIG. 5, which will not be further particularly defined herein.

The present disclosure further provides in some embodiments a network device, including a processor, a memory, and a computer program stored in the memory and capable of being executed by the processor. The computer program is executed by the processor so as to implement the step of the above-mentioned random access method for the network device with a same technical effect, which will not be further particularly defined herein.

Figure 6:
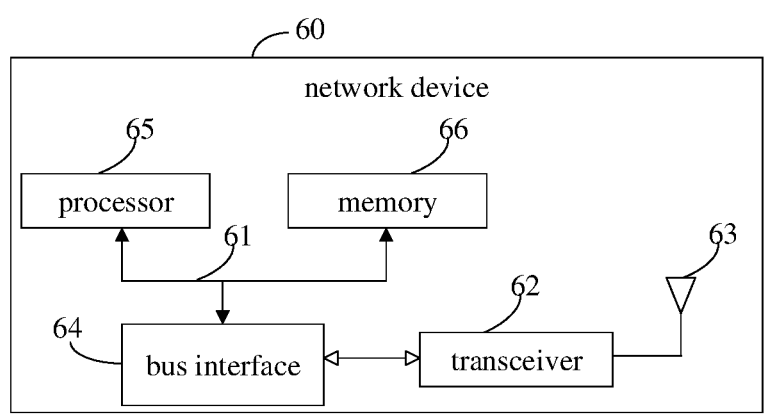
FIG. 6 is another schematic view of a network device according to an embodiment of the present disclosure.

To be specific, FIG. 6 shows a hardware structure of the network device according to an embodiment of the present disclosure. The network device 60 may include, but not limited to, a bus 61, a transceiver 62, an antenna 63, a bus interface 64, a processor 65 and a memory 66.

In the embodiments of the present disclosure, the network device 60 may further include a computer program stored in the memory 66 and capable of being executed by the processor 65. The computer program is configured to be executed by the processor 65 to receive a random access message 1. A payload part may be carried in the random access message 1, and acquired through performing modulation and coding according to a target MCS.

The transceiver 62 is configured to receive and transmit data under the control of the processor 65.

In FIG. 6, bus architecture (represented by the bus 61) may include a number of buses and bridges connected to each other, so as to connect various circuits for one or more processors represented by the processor 65 and one or more memories represented by the memory 66. In addition, as is known in the art, the bus 61 may be used to connect other circuits, such as a circuit for a peripheral device, a circuit for a voltage stabilizer and a power management circuit, which will not be further particularly defined herein. The bus interface 64 may be provided between the bus 61 and the transceiver 62, and the transceiver 62 may consist of one element, or more than one elements, e.g., transmitters and receivers for communication with other devices over a transmission medium. Data processed by the processor 65 may be transmitted on a wireless medium via the antenna 63. Further, the antenna 63 may further receive data and transmit the data to the processor 65.

The processor 65 may take charge of managing the bus 61 as well as general processings, and may further provide various functions such as timing, peripheral interfacing, voltage adjustment, power source management and other control functions. The memory 66 may store therein data for the operation of the processor 65.

Optionally, the processor 65 may be a CPU, an ASIC, a FPGA or a CPLD.

The present disclosure further provides in some embodiments a computer-readable storage medium storing therein a computer program. The computer program is configured to be executed by a processor, to implement the above-mentioned random access methods with a same technical effect, which will not be further particularly defined herein. The computer-readable storage medium may be, e.g., a read-only memory (Read-Only Memory, ROM), a random access memory (Random Access Memory, RAM), a magnetic disk or an optical disk.

It should be appreciated that, such words as "include" or "including" or any other variations involved in the present disclosure intend to provide non-exclusive coverage, so that a procedure, method, article or device including a series of elements may also include other elements not listed herein, or may include inherent elements of the procedure, method, article or device. If without any further limitations, for the elements defined by such sentence as "including one . . . ", it is not excluded that the procedure, method, article or device including the elements may also include other identical elements.

Through the above-mentioned description, it may be apparent for a person skilled in the art that the method embodiments may be implemented by software as well as a necessary common hardware platform, or by hardware, and the former may be better in most cases. Based on this, the technical solutions of the present disclosure, essentially, or parts of the technical solutions of the present disclosure contributing to the prior art, may appear in the form of software products, which may be stored in a storage medium (e.g., ROM/RAM, magnetic disk or optical disk) and include instructions so as to enable a terminal (e.g., mobile phone, computer, server, air conditioner or network device) to execute the method in the embodiments of the present disclosure.

The embodiments of the present disclosure have been described above with reference to the drawings, but the present disclosure is not limited to the above-mentioned specific embodiments. The above-mentioned specific embodiments are only illustrative and not restrictive. Under the teaching of the present disclosure, a person skilled in the art may make various modifications without departing from the principle of the present disclosure and the protection scope of the claims, which shall also fall within the scope of the present disclosure.

What is claimed is:

1. A random access method for a terminal device, comprising:
    transmitting a random access message 1;
    wherein a payload part and a preamble are carried in the random access message 1, the payload part is carried by a physical uplink shared channel (PUSCH), and the payload part is acquired through performing modulation and coding according to a target modulation and coding scheme (MCS),
    wherein prior to transmitting the random access message 1, the random access method further comprises:
    acquiring an MCS set; and
    selecting the target MCS from the MCS set,
    wherein the MCS set is an MCS set indicated by a system broadcasting message or high-layer signaling;
    wherein the selecting the target MCS from the MCS set comprises:
    selecting the target MCS from the MCS set according to a signal measurement result and a payload size of the random access message 1.

2. The random access method according to claim 1, wherein uplink control information (UCI) is carried in the random access message 1, the UCI is used to explicitly indicate the target MCS;
    or
    a demodulation reference signal (DMRS) is carried in the random access message 1, the DMRS is used to implicitly indicate the target MCS;
    or
    the preamble and/or a Physical Random Access Channel (PRACH) occasion corresponding to the preamble are used to implicitly indicate the target MCS.

3. The random access method according to claim 2, wherein the UCI is modulated and coded through using a predefined MCS or an MCS configured by a network device.

4. The random access method according to claim 2, wherein a configuration parameter of the DMRS is configured by the network device, and comprises a plurality of DMRS configurations or a plurality of DMRS sequences.

5. The random access method according to claim 4, wherein when the configuration parameter of the DMRS comprises number a of DMRS configurations, one or number b of DMRS configurations are associated with one MCS in the MCS set; or
    when the configuration parameter of the DMRS comprises number c of DMRS sequences, one or number d of DMRS sequences are associated with one MCS in the MCS set;
    wherein the number a, the number b, the number c and the number d are each a positive integer greater than 1, the number b is smaller than or equal to the number a, and the number d is smaller than or equal to the number c.

6. The random access method according to claim 2, wherein an association relationship between the preamble and the target MCS is configured by the network device, and one or more preambles are associated with one MCS in the MCS set.

7. The random access method according to claim 2, wherein an association relationship between the PRACH occasion and the target MCS is configured by the network device, and one or more PRACH occasions are associated with one MCS in the MCS set.

8. A random access method for a network device, comprising:
    receiving a random access message 1;
    wherein a payload part and a preamble are carried in the random access message 1, the payload part is carried by a PUSCH, and the payload part is acquired through performing modulation and coding according to a target MCS,
    wherein the target MCS is selected from an MCS set according to a signal measurement result and a payload size of the random access message 1, and the MCS set is an MCS set indicated by a system broadcasting message or high-layer signaling.

9. The random access method according to claim 8, wherein subsequent to receiving the random access message 1, the random access method further comprises any one of:
acquiring the target MCS according to UCI carried in the random access message 1;
acquiring the target MCS according to a DMRS carried in the random access message 1;
acquiring the target MCS according to the preamble carried in the random access message 1 and/or a PRACH occasion corresponding to the preamble;
wherein the UCI is used to explicitly indicate the target MCS, the DMRS is used to implicitly indicate the target MCS, and the preamble and/or the PRACH occasion corresponding to the preamble are used to implicitly indicate the target MCS.

10. A terminal device, comprising a memory, a processor, and a computer program stored in the memory and capable of being executed by the processor, wherein the computer program is configured to be executed by the processor to:
transmit a random access message 1;
wherein a payload part and a preamble are carried in the random access message 1, the payload part is carried by a PUSCH, and the payload part is acquired through performing modulation and coding according to a target MCS,
wherein the computer program is further configured to be executed by the processor to: prior to transmitting the random access message 1,
acquire an MCS set; and
select the target MCS from the MCS set,
wherein the MCS set is an MCS set indicated by a system broadcasting message or high-layer signaling,
wherein the selecting the target MCS from the MCS set comprises:
selecting the target MCS from the MCS set according to a signal measurement result and a payload size of the random access message 1.

11. The terminal device according to claim 10, wherein UCI is carried in the random access message 1, the UCI is used to explicitly indicate the target MCS;
or
a DMRS is carried in the random access message 1, the DMRS is used to implicitly indicate the target MCS;
or
the preamble and/or a PRACH occasion corresponding to the preamble are used to implicitly indicate the target MCS.

12. The terminal device according to claim 11, wherein the UCI is modulated and coded through using a predefined MCS or an MCS configured by a network device.

13. The terminal device according to claim 11, wherein a configuration parameter of the DMRS is configured by the network device, and comprises a plurality of DMRS configurations or a plurality of DMRS sequences.

14. The terminal device according to claim 13, wherein when the configuration parameter of the DMRS comprises number a of DMRS configurations, one or number b of DMRS configurations are associated with one MCS in the MCS set; or
when the configuration parameter of the DMRS comprises number c of DMRS sequences, one or number d of DMRS sequences are associated with one MCS in the MCS set;
wherein the number a, the number b, the number c and the number d are each a positive integer greater than 1, the number b is smaller than or equal to the number a, and the number d is smaller than or equal to the number c.

15. The terminal device according to claim 11, wherein an association relationship between the preamble and the target MCS is configured by the network device, and one or more preambles are associated with one MCS in the MCS set.

16. A network device, comprising a memory, a processor, and a computer program stored in the memory and capable of being executed by the processor, wherein the computer program is configured to be executed by the processor to implement the step of the random access method according to claim 8.

17. A non-transitory computer-readable storage medium storing therein a computer program, wherein the computer program is used to be executed by a processor to implement the step of the random access method according to claim 1.

18. The non-transitory computer-readable storage medium according to claim 17, wherein UCI is carried in the random access message 1, the UCI is used to explicitly indicate the target MCS;
or
a DMRS is carried in the random access message 1, the DMRS is used to implicitly indicate the target MCS;
or
the preamble and/or a PRACH occasion corresponding to the preamble are used to implicitly indicate the target MCS.

19. The non-transitory computer-readable storage medium according to claim 18, wherein the UCI is modulated and coded through using a predefined MCS or an MCS configured by a network device.

20. The non-transitory computer-readable storage medium according to claim 18, wherein a configuration parameter of the DMRS is configured by the network device, and comprises a plurality of DMRS configurations or a plurality of DMRS sequences.

* * * * *